United States Patent Office 3,001,957
Patented Sept. 26, 1961

---

3,001,957
AQUEOUS LATEX COMPRISING VINYL ACETATE POLYMER AND AMINO ETHER OF STARCH AND METHOD OF COATING FIBROUS SHEET MATERIAL THEREWITH
Raymond Joseph Kray, Summit, and Frank Michael Berardinelli, South Orange, N.J., assignors to Celanese Corporation of America, New York, N.Y., a corporation of Delaware
No Drawing. Filed Nov. 8, 1957, Ser. No. 695,232
15 Claims. (Cl. 260—17.4)

This invention relates to latices containing particles of a polymer of vinyl acetate and particularly to latices used in the coating or sizing of fibrous sheet materials, such as textiles and paper.

Latices containing particles of a polymer of vinyl acetate are used as impregnants of textiles to increase snag resistance and slip resistance and as impregnants of paper to increase wet strength. Since textiles and paper generally carry a negative electrostatic charge and since the polymer particles in conventional latices are also negatively charged, it is generally necessary to use latices of high polymer content in order to deposit an appreciable amount of polymer on the knitted or woven textile or on paper.

It is an object of this invention to prepare latices wherein the polymer particles are positively charged and wherein particles migrate to the textile or paper despite a relatively low solids concentration. Other objects will appear hereinafter.

The objects of this invention are achieved by the preparation and utilization of an aqueous latex comprising particles of a polymer of vinyl acetate and a cationic colloid.

While it is not desired to be bound by any particular theory, it is believed that each particle of the vinyl acetate polymer is surrounded by particles of the cationic protective colloid which impart an overall positive charge to the particle.

The latices of the present invention are generally prepared by polymerizing vinyl acetate, alone or with a comonomer, in an aqueous system containing at least one free radical-producing initiator and at least one non-anionic surface active agent.

When a copolymer is desired, the mol ratio of the comonomer to the vinyl acetate is maintained at a value so that the number of monomeric units from the comonomer constitute no more than about 50% and generally between about 5 and about 30% of the total number of monomeric units in the copolymer. Among the comonomers which may be used are ethyl acrylate, methyl acrylate, dibutyl maleate, vinyl stearate, dibutyl fumarate, vinyl propionate, vinyl butyrate, dibutyl itaconate, butyl acrylate, 2 ethylhexyl acrylate, vinyl 2-ethyl hexoate, octyl fumarate and octyl maleate.

The monomer or monomers are preferably fed to the polymerization zone incrementally over a period between about 2 and about 4 hours. The final total weight of polymer produced in the system is generally between about 30% and about 60% based on the total weight of the latex.

The free radical-producing initiators are generally compounds or mixtures of compounds which contain peroxidic oxygen. Alkali metal persulfates, such as potassium persulfate, have been found to be very effective peroxidic initiators. Other suitable initiators are well known in the art, e.g. hydrogen peroxide, and such combinations as mixtures of hydrogen peroxide and an iron salt, hydrogen peroxide and zinc formaldehyde sulfoxylate or other similar reducing agent; hydrogen peroxide and a titanous salt; potassium persulfate and sodium bisulfate; a bromate mixed with a bisulfate; and other redox catalyst systems. The proportion of the free radical-producing initiator, or catalyst, may be varied, one suitable range being 0.05 to 0.3% based on the total weight of the latex.

The surface active agents which are generally used in accordance with this invention are non-anionic in character. Non-ionic or cationic surface active agents may be used, with the latter being preferred. Among the cationic surface active agents which may be used are long chain alkyl ammonium halides, e.g. cetyl trimethyl ammonium bromide and myristo amido propyl dimethyl benzyl ammonium bromide; long chain pyridinium halides, e.g. lauryl pyridinium bromide; and long chain alkyl phosphonium and sulfonium compounds and imidazoline salts such as tridecyl benzyl hydroxyethyl imidazolinium chloride.

Among the suitable non-ionic surface active agents are those which contain polymerized ethylene oxide units, such as ethylene oxide polymers, ethylene oxide propylene oxide block polymer, ethylene oxide derivatives of long chain carboxylic acids, such as lauric, palmitic or oleic acids, and ethylene oxide derivatives of long chain alcohols, such as octyl, decyl or cetyl alcohols. Polyvinyl alcohols may also be used as non-ionic surface active agents. Other surface active agents which may be used are compounds wherein polyhydric alcohols, as hydrophilic agents, are reacted at one, or at most two hydroxy groups with a hydrophilic agent such as a long chain carboxylic acid, a long chain alcohol, a phenol, an alkyl phenol, an amide or an amine. Among the polyhydric alcohols which may be used are glycerol, sorbitol, mannitol, ethylene glycol, propylene glycol, pentaerythritol, and erythritol. Glyceryl monostearate is an example of a specific compound of this type.

If desired, two or more surface active agents may be used. For the best results the proportion of surface active agent should be between about 1 and about 3 weight percent based on the total weight of the latex.

The cationic colloid is preferably added to the mixture prior to polymerization, although it is within the scope of this invention to add the cationic protective colloid after polymerization is completed. The preferred cationic protective colloids are the amine ethers of starch, and particularly the products having the formula

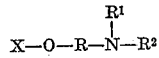

wherein X is starch, R is a radical selected from the group consisting of alkyl and hydroxyalkyl radicals and each of the $R^1$ and $R^2$ are selected from the group consisting of hydrogen, alkyl radicals, aryl radicals and aralkyl radicals. These products are sold commercially under the name "Cato Starches." A complete description of their preparation may be found in Canadian Patent No. 525,108, issued May 15, 1956, to Carlyle G. Caldwell and Otto B. Wurzburg. Other cationic protective colloids such as amino derivatives of hydroxy ethyl cellulose may also be used.

Among the specific types of amino ethers which may be used are the amino alkyl, alkyl amino alkyl, dialkyl amino alkyl, amino hydroxyalkyl, alkyl amino hydroxy alkyl and dialkyl amino hydroxyalkyl ethers of starch as well as the corresponding aryl and arylalkyl derivatives.

The protective colloids are generally added in amounts between about 0.2 and about 1.0 weight percent, based on the entire weight of the latex, and preferably in amounts between about 0.4 and about 0.8 weight percent.

The polymerization reaction is preferably carried out at an elevated temperature, e.g. about 60° C. to 95° C. and most preferably between 75° C. and 85° C. However, lower temperatures may be used with more active initiator systems. Polymerization may be carried out at atmospheric, superatmospheric, or subatmospheric pressures.

The latices of this invention may be applied to textile materials such as cotton, wool, silk, nylon, viscose rayon, secondary cellulose acetate, cellulose triacetate, polyesters, acrylonitrile polymers and others. Generally, the latex has a solids content between about 0.1 and about 5.0 weight percent and the fabric is immersed therein at a temperature between about 100° F. and 180° F., with agitation for a period between about 0.01 and about 20 minutes. The fabric is dried at a temperature between about 150° F. and 250° F.

The latices are best applied to paper during the manufacture thereof as for example, by being agitated with a bleached sulfite pulp in a beater.

*Example*

To 420 parts of water was charged 6.06 parts of the β-diethyl amino ethyl ether of starch (hydrochloride salt), 3.17 parts of cetyl-trimethylammonium bromide, and 24 parts of a polyoxyethylated nonyl phenol. The batch was heated up to 60° C. with stirring until solution was complete. To the aqueous solution was added 27 parts of vinyl acetate and 1.52 parts of potassium persulfate and the batch was slowly heated with stirring to 82° C. over a 20 minute period. At this point the delayed monomer was added at the rate of 2.08 parts/minute. The delayed catalyst consisting of 0.38 part of potassium persulfate in 9.8 parts of water was added over a 3 hour period intermittently whenever the monomer started to reflux (catalyst was not added during the last hour of monomer addition). The temperature of the reaction mixture was maintained at 78–80° C. during the entire monomer addition. At the end of the monomer addition the temperature of the batch was raised to 90° C. and maintained at that temperature for ½ hour. The batch was then cooled to 25° C.

A 1% suspension of this latex in distilled water was prepared and used to fill a Northrop-Kunitz cataphoresis cell. The electrodes of the cell were connected to a 45 volt battery and the cell was placed on a microscope stage under 230× magnification. The polymer particles in the middle layer of the cell were observed to rapidly migrate towards the cathode indicating that they had a positive charge. If the battery leads were immersed in the undiluted latex the negative lead was distantly coated with polyvinyl acetate.

It is to be understood that the foregoing detailed description is given merely by way of illustration and that many variations may be made therein without departing from the spirit of our invention.

Having described our invention, what we desire to secure by Letters Patent is:

1. An aqueous latex comprising particles of a dispersed polymer of vinyl acetate containing at least about 50% vinyl acetate polymerized therein, a cationic surface active agent and colloidal particles of a cationic protective colloid comprising an amino ether of starch.

2. An aqueous latex comprising dispersed particles of polyvinyl acetate, a cationic surface active agent and colloidal particles of a cationic protective colloid comprising an etherification product of starch having the formula

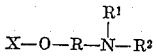

wherein X is a glucose unit of starch, R is a radical selected from the group consisting of alkyl and hydroxyalky radicals and each of $R^1$ and $R^2$ are selected from the group consisting of hydrogen, alkyl radicals, aryl radicals and aralkyl radicals, said colloidal particles being present in an amount between about 0.2 and about 1.0 weight percent based on the entire weight of the latex.

3. The latex of claim 2 wherein said cationic surface active agent is a long chain alkyl ammonium halide.

4. The latex of claim 3 wherein said cationic surface active agent is trimethyl ammonium bromide.

5. An aqueous latex comprising dispersed particles of polyvinyl acetate, a cationic surface active agent and colloidal particles of a cationic protective colloid comprising an amino alkyl ether of starch.

6. An aqueous latex comprising dispersed particles of polyvinyl acetate, a cationic surface active agent and colloidal particles of a cationic protective colloid comprising an alkyl amino alkyl ether of starch.

7. An aqueous latex comprising dispersed particles of polyvinyl acetate, a cationic surface active agent and colloidal particles of a cationic protective colloid comprising an amino hydroxyalkyl ether of starch.

8. An aqueous latex comprising dispersed particles of polyvinyl acetate, a cationic surface active agent and colloidal particles of a cationic protective colloid comprising an alkyl amino hydroxyalkyl ether of starch.

9. An aqueous latex comprising dispersed particles of polyvinyl acetate, a cationic surface active agent and colloidal particles of a cationic protective colloid comprising a dialkyl amino alkyl ether of starch.

10. An aqueous latex comprising dispersed particles of polyvinyl acetate, a cationic surface active agent and colloidal particles of a cationic protective colloid comprising diethyl amino ethyl ether of starch.

11. A process of applying polyvinyl acetate to a fibrous sheet material which comprises contacting the fibers of said sheet material with an aqueous latex comprising dispersed particles of polyvinyl acetate, a cationic surface active agent and a cationic protective colloid comprising an amino ether of starch and thereafter drying said sheet material in the presence of said polyvinyl acetate and said cationic protective colloid.

12. The process of claim 11 wherein said fibrous sheet material is a woven textile.

13. The process of claim 11 wherein said fibrous sheet material is a knitted textile.

14. The process of claim 11 wherein said fibrous sheet material is paper.

15. The process of claim 11 wherein said cationic protective colloid is an etherification product of starch having the formula

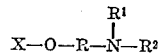

wherein X is a glucose unit of starch, R is a radical selected from the group consisting of alkyl and hydroxyalkyl radicals and each of $R^1$ and $R^2$ are selected from the group consisting of hydrogen, alkyl radicals, aryl radicals and aralkyl radicals.

References Cited in the file of this patent

UNITED STATES PATENTS

| | | |
|---|---|---|
| 2,444,396 | Collins et al. | June 29, 1948 |
| 2,508,341 | Wilson | May 16, 1950 |
| 2,536,018 | Schoenholz et al. | Jan. 2, 1951 |
| 2,536,470 | Schoenholz et al. | Jan. 2, 1951 |
| 2,780,562 | Reinartz et al. | Feb. 5, 1957 |
| 2,813,093 | Caldwell et al. | Nov. 12, 1957 |